(12) United States Patent
Yamazaki

(10) Patent No.: US 8,368,845 B2
(45) Date of Patent: Feb. 5, 2013

(54) ELECTRONIC DEVICE WITH LIQUID CRYSTAL DISPLAY

(75) Inventor: Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 68 days.

(21) Appl. No.: 12/249,260

(22) Filed: Oct. 10, 2008

(65) Prior Publication Data

US 2009/0046218 A1 Feb. 19, 2009

Related U.S. Application Data

(60) Continuation of application No. 10/989,361, filed on Nov. 17, 2004, now Pat. No. 7,916,130, and a division of application No. 09/385,020, filed on Aug. 30, 1999, now Pat. No. 7,262,754.

(30) Foreign Application Priority Data

Sep. 3, 1998 (JP) .................................. 10-248931

(51) Int. Cl.
*G02F 1/1335* (2006.01)
(52) U.S. Cl. .......................................... 349/69; 349/42
(58) Field of Classification Search .................. 349/62, 349/65, 69
See application file for complete search history.

(56) References Cited

U.S. PATENT DOCUMENTS

| | | | |
|---|---|---|---|
| 4,445,132 A | 4/1984 | Ichikawa et al. | |
| 4,822,145 A | 4/1989 | Staelin | |
| 4,963,859 A | 10/1990 | Parks | |
| 4,978,952 A | 12/1990 | Irwin | |
| 5,206,749 A | 4/1993 | Zavracky et al. | |
| 5,287,205 A | 2/1994 | Yamazaki et al. | |
| 5,334,993 A | 8/1994 | Okajima et al. | |
| 5,341,231 A | 8/1994 | Yamamoto et al. | |
| 5,375,043 A | 12/1994 | Tokunaga | |
| 5,453,855 A | 9/1995 | Nakamura et al. | |
| 5,506,598 A | 4/1996 | Shimada et al. | |

(Continued)

FOREIGN PATENT DOCUMENTS

| | | |
|---|---|---|
| EP | 0 593 266 | 4/1994 |
| EP | 0878720 A | 11/1998 |

(Continued)

OTHER PUBLICATIONS

"Full Color Liquid Crystal Display in a Field Sequential Utilizing a High Speed Response Characteristics of OCB Liquid Crystal," Miyashita et al., Liquid Crystal Society: LCD Forum Sponsorship, 1998, pp. 7-15.

(Continued)

*Primary Examiner* — Eric Wong
(74) *Attorney, Agent, or Firm* — Eric J. Robinson; Robinson Intellectual Property Law Office, P.C.

(57) ABSTRACT

An electronic device, such as personal computer, incorporating a liquid crystal panel which uses LEDs as an illuminating light source for a liquid crystal panel to reduce power consumption and size of the electronic device. When 3-color LED lamps 13R, 13G, 13B of the LED light source 12 are lit, red, green and blue rays emitted from respective LED lamps enter the scatterplate 11 where they are scattered and mixed to produce white light LW which goes out from the entire surface of the scatterplate 11 to illuminate the entire rear surface of the transmission type liquid crystal panel 10. The white light LW that has entered the liquid crystal panel 10 is modulated according to the alignment of the liquid crystal material and passes through the color filters of the counter substrate. The user can view the transmitted light LT from the liquid crystal panel 10 as a color image.

60 Claims, 6 Drawing Sheets

U.S. PATENT DOCUMENTS

| | | | | |
|---|---|---|---|---|
| 5,532,854 | A | 7/1996 | Fergason | |
| 5,608,550 | A | 3/1997 | Epstein et al. | |
| 5,671,994 | A * | 9/1997 | Tai et al. | 362/603 |
| 5,738,731 | A | 4/1998 | Shindo et al. | |
| 5,751,383 | A | 5/1998 | Yamanaka | |
| 5,757,348 | A | 5/1998 | Handschy et al. | |
| 5,777,594 | A | 7/1998 | Miyawaki | |
| 5,828,429 | A | 10/1998 | Takemura | |
| 5,890,790 | A | 4/1999 | Osawa | |
| 5,894,539 | A | 4/1999 | Epstein | |
| 5,896,119 | A | 4/1999 | Evanicky et al. | |
| 5,923,311 | A | 7/1999 | Edwards | |
| 5,926,240 | A | 7/1999 | Hirota et al. | |
| 5,929,951 | A | 7/1999 | Sasakura et al. | |
| 5,953,469 | A | 9/1999 | Zhou | |
| 5,995,189 | A | 11/1999 | Zhang | |
| 5,999,282 | A | 12/1999 | Suzuki et al. | |
| 6,007,209 | A | 12/1999 | Pelka | |
| 6,018,379 | A | 1/2000 | Mizobata et al. | |
| 6,025,252 | A | 2/2000 | Shindo et al. | |
| 6,025,894 | A | 2/2000 | Shirasaki et al. | |
| 6,069,440 | A | 5/2000 | Shimizu et al. | |
| 6,073,034 | A | 6/2000 | Jacobsen et al. | |
| RE36,792 | E | 7/2000 | Sonehara | |
| 6,106,734 | A | 8/2000 | Shindo et al. | |
| 6,115,016 | A | 9/2000 | Yoshihara et al. | |
| 6,124,911 | A | 9/2000 | Nakamura et al. | |
| 6,137,120 | A | 10/2000 | Shindo et al. | |
| 6,166,787 | A | 12/2000 | Akins et al. | |
| 6,177,706 | B1 | 1/2001 | Shindo et al. | |
| 6,181,311 | B1 | 1/2001 | Hashimoto | |
| 6,219,116 | B1 | 4/2001 | Yuuki et al. | |
| 6,225,668 | B1 | 5/2001 | Shindo et al. | |
| 6,243,068 | B1 | 6/2001 | Evanicky et al. | |
| 6,243,069 | B1 | 6/2001 | Ogawa et al. | |
| 6,266,108 | B1 * | 7/2001 | Bao et al. | 349/63 |
| 6,281,867 | B2 | 8/2001 | Kurematsu et al. | |
| 6,304,243 | B1 | 10/2001 | Kondo et al. | |
| 6,326,981 | B1 * | 12/2001 | Mori et al. | 345/695 |
| 6,337,536 | B1 | 1/2002 | Matsubara et al. | |
| 6,340,824 | B1 | 1/2002 | Komoto et al. | |
| 6,384,818 | B1 | 5/2002 | Yamazaki et al. | |
| 6,586,874 | B1 * | 7/2003 | Komoto et al. | 313/503 |
| 6,677,214 | B1 | 1/2004 | Shindo et al. | |
| 6,734,929 | B2 * | 5/2004 | Sugiura et al. | 349/65 |
| 6,742,907 | B2 | 6/2004 | Funamoto et al. | |
| 6,803,886 | B2 | 10/2004 | Kondo et al. | |
| 6,819,376 | B1 | 11/2004 | Muramatsu | |
| 7,333,172 | B1 | 2/2008 | Zhang | |
| 7,394,516 | B2 | 7/2008 | Zhang | |
| 7,956,978 | B2 | 6/2011 | Zhang | |
| 8,194,224 | B2 | 6/2012 | Zhang | |
| 2001/0045927 | A1 | 11/2001 | Zavracky et al. | |
| 2009/0058795 | A1 | 3/2009 | Yamazaki | |
| 2011/0024740 | A1 * | 2/2011 | Yamazaki et al. | 257/43 |

FOREIGN PATENT DOCUMENTS

| | | |
|---|---|---|
| EP | 1341009 A | 9/2003 |
| JP | 62-251723 | 11/1987 |
| JP | 0 507 639 | 10/1992 |
| JP | 0 545 705 | 6/1993 |
| JP | 05-158033 | 6/1993 |
| JP | 05-289076 | 11/1993 |
| JP | 07-020985 | 1/1995 |
| JP | 0 659 910 | 6/1995 |
| JP | 07-191311 | 7/1995 |
| JP | 07-239482 | 9/1995 |
| JP | 07-253853 | 10/1995 |
| JP | 07-301714 | 11/1995 |
| JP | 08-050291 | 2/1996 |
| JP | 08-211361 | 8/1996 |
| JP | 09-146089 | 6/1997 |
| JP | 09-172201 | 6/1997 |
| JP | 09-230342 | 9/1997 |
| JP | 10-063204 | 3/1998 |
| JP | 10-161113 | 6/1998 |
| JP | 10-161123 | 6/1998 |
| JP | 10-221692 | 8/1998 |
| WO | WO-98/13709 | 4/1998 |

OTHER PUBLICATIONS

"Field Sequential Full Color LCD," Okita, M., Monthly Display, Jul. 1998, Separate Edition, pp. 11-16 and News Flash.

European Patent Office, Search Report, Mar. 8, 2001, 3 pages.

Tatsuaki Funamoto et al., "A Front-lighting System Utilizing A Thin Light Guide," ASIA Display, 1998, pp. 897-900.

H. J. Cornelissen et al., "Frontlights for Reflective LCDs Based on Lightguides with Micro-Grooves," SID 99 Digest, 1999, pp. 912-915.

Tai et al., "24.1: A Transparent Frontlighting System for Reflective-Type Displays," pp. 375-378, 1995, SID Digest.

Howard et al., "37.2: Gyricon Electric Paper," pp. 1010-1013, 1998, SID Digest.

Nakamura et al., "37.3: Development of Electrophoretic Display Using Microcapsulated Suspension," pp. 1014-1017, 1998, SID Digest.

Bryning et al., "37.4: Reverse-Emulsion Electrophoretic Display (REED)," pp. 1018-1021, 1998, SID Digest.

A. Tanaka, "Trends of Backlighting and Frontlighting Systems for LCD," pp. 347-350, 1998, Fujitsu Kasei Limited Planning and Development Division.

European Search Report of Jun. 30, 2005 for EP Application No. 05 012 260.5.

Office Action (European Application No. 05012260.5) dated Nov. 5, 2007.

Office Action (Application No. 05012260.5) Dated Oct. 10, 2008.

Office Action (U.S. Appl. No. 12/249,266) dated Oct. 13, 2011.

Office Action (U.S. Appl. No. 12/249,266) dated Jun. 16, 2011.

European Patent Office, Search Report, European Application No. 99117293.3, Mar. 8, 2001, 3 pages.

Office Action (European Application No. 05012260.5) Dated Oct. 10, 2008.

A. Tanaka, "Trends of Backlighting and Frontlighting Systems for LCD," pp. 347-350, 1998, IDW '98.

European Office Action (Application No. 05012260.5) Dated Nov. 2, 2011.

Okita.M, "Field Sequential Full Color LCD Without Color Filter,", Field Sequential Full Color LCD (Monthly Display Separate Edition), Jul. 1, 1998, pp. 11-16.

Tanaka.A, "Trends of Backlighting and Frontlighting Systems for LCD,", IDW '98 : Proceedings of the 5th International Display Workshops, Dec. 7, 1998, pp. 347-350.

* cited by examiner

- LT Transmitted Light
- 10 Transmission Type Liquid Crystal Panel
- LT White Rays
- 11 Scatterplate
- 14 Substrate
- 13 LED Lamps
- 12 LED Light Source

- 13G Green LED Lamps
- 13B Blue LED Lamps
- 13R Red LED Lamps

LED Light Source 31    Lens 70    Reflection Type Liquid Crystal Panel 30

90 LED Lamp
90R   90G   90B
Resin 90b
Substrate 90a

90 LED Lamp
90R Red LED Array
90G Green LED Array
90B Blue LED Array

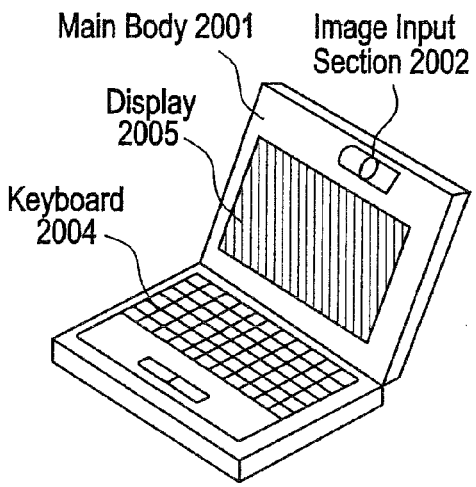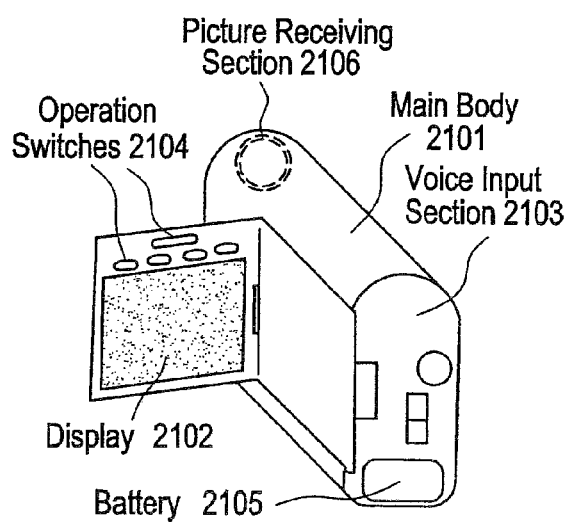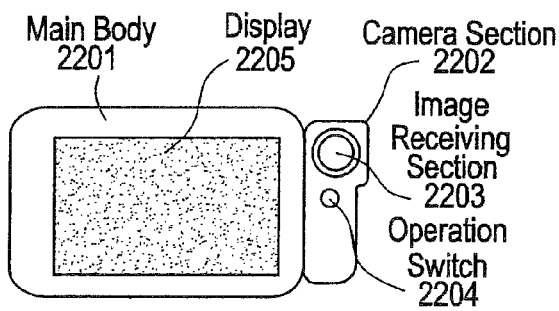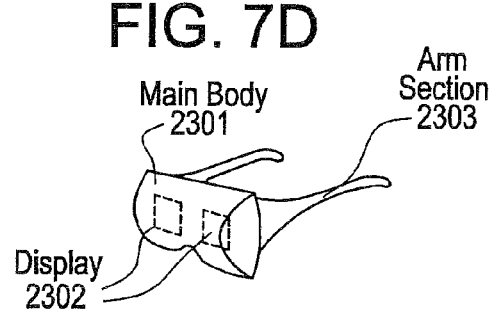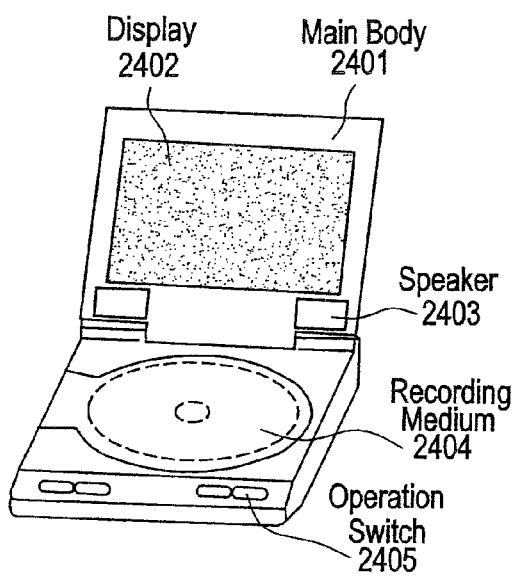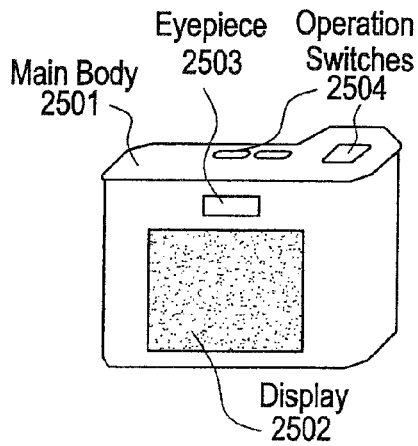

ELECTRONIC DEVICE WITH LIQUID CRYSTAL DISPLAY

BACKGROUND OF THE INVENTION

1. Field of the Invention

The present invention relates to electronic apparatus with a direct-viewing type liquid crystal panel which uses a light emitting diode (LED) as an illumination source for the liquid crystal panel.

The electronic apparatus of the invention include information processing devices, such as note or laptop personal computers and mobile computers, head-mounted displays, video cameras, digital still cameras, car navigation systems, and cellular phones.

2. Description of Related Art

In recent years, research and development have been conducted on the liquid crystal panel production technology and resulted in a relatively inexpensive price of the liquid crystal panel. Further, as the information society has progressed in the filed of the Internet and electronic mail, the note type personal computers (hereinafter referred to as note type PCs) have rapidly prevailed.

The digital still cameras and video cameras incorporate a liquid crystal panel so that a photographed picture can be viewed on the site. Because of this advantage, these cameras have gained popularity with consumers.

There are two types of liquid crystal panel: a transmission type and a reflection type. The transmission type liquid crystal panel has a backlight installed at the back of the panel whose illumination light passes through the liquid crystal panel to form an image on the display that can be seen by the user. The reflection type liquid crystal panel, on the other hand, does not require a backlight and forms an image by reflecting external light by the liquid crystal panel. The display quality of the reflection type, however, does not match that of the transmission type.

Because the note PCs and digital cameras are used for displaying Internet home pages in color, importance is placed on the display quality such as color reproducibility and the liquid crystal panel for use with these electronic devices needs to be of a transmission type.

Generally, the backlight source for the transmission type liquid crystal panel uses a cold cathode tube that emits white rays. The cold cathode tube is a fluorescent lamp and thus requires a high-voltage AC power supply to be turned on. Hence, the electronic devices such as note PCs require a DC-AC converter for converting a DC power supply into an AC power supply of several hundred volt.

At present, essential factors in improving the portability of electronic devices are reductions in power consumption, size and weight. Although the power consumption of the liquid crystal panel itself is small, the use of a backlight of a conventional cold cathode tube requires a high voltage, which hinders the reduction in power consumption. Another drawback is that the cold cathode tube has a short life time of about 2,000 hours.

SUMMARY OF THE INVENTION

The present invention has been accomplished in light of the problems described above and provides electronic devices incorporating a liquid crystal panel that has overcome the drawbacks of high power consumption and short longevity (life) of the light source.

In the information device incorporating a liquid crystal panel that overcomes the aforementioned drawbacks, the illuminating light source for the liquid crystal panel comprises: 3-color light emitting diodes for producing three primary colors for additive color mixing; and a means for mixing rays from the three-color LEDs to produce white light.

In this embodiment, the use of LEDs as a light source for illuminating the liquid crystal panel makes it possible to easily reduce power consumption and size of the electronic device such as a note PC.

LED is a solid element using the photoelectric conversion effect of a semiconductor. Illuminating an LED requires application of DC voltage of about 1.5 V and thus eliminates the need for the conventional DC-AC converter, which in turn results in a significant reduction in power consumption. The LED is a semiconductor device and thus more reliable and has a smaller size and a longer life than the cold cathode tube.

In the construction described above, the 3-color LEDs for generating three primary colors for additive color mixing—typically red, green and blue LEDs—emit color rays of light which are mixed to produce white light that in turn is used for illuminating the liquid crystal panel.

BRIEF DESCRIPTION OF THE DRAWINGS

FIG. 1 (B) is a plan view partially showing a LED light source.

FIGS. 7(A) to 7(F) are external views showing examples of electronic devices.

DESCRIPTION OF THE PREFERRED EMBODIMENTS

The invention will be described by referring to FIGS. 1 to 7.

Embodiment 1

Figure 2:
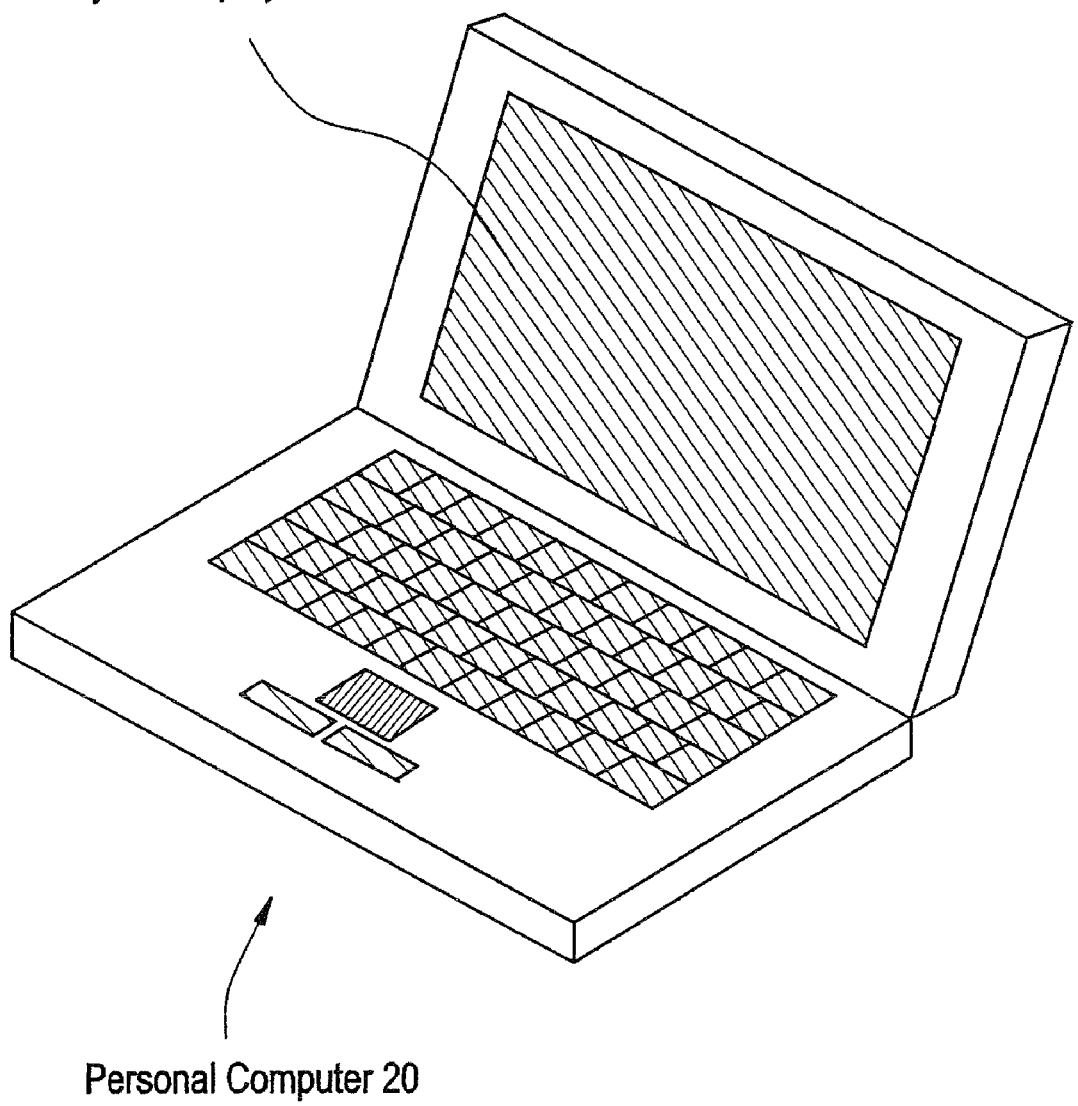
FIG. 2 is an external perspective view of a note PC.

This embodiment represents an example in which the present invention is applied to a note PC (personal computer) incorporating a liquid crystal display. FIG. 2 shows a rough external perspective view of a note PC 20 which has a liquid crystal display 21 using a color display as a display means.

Figure 1A:
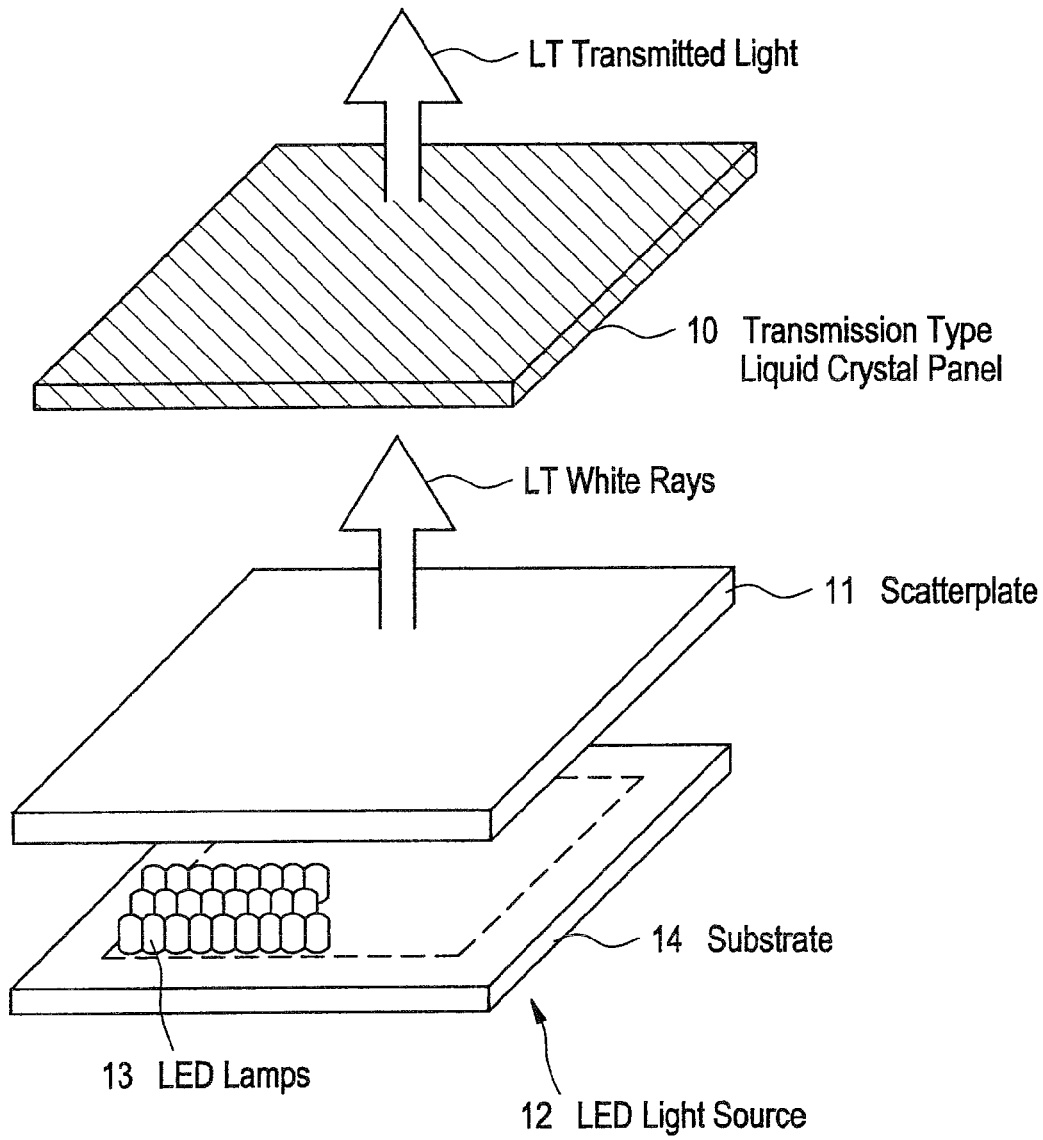
FIG. 1 (A) is an exploded perspective view of an essential part of a transmission type liquid crystal display.

FIG. 1 (A) is an exploded perspective view of a main portion of the liquid crystal display 21 which has a scatterplate 11 and an LED light source 12 arranged in that order behind a transmission type liquid crystal panel 10.

Figure 1B:
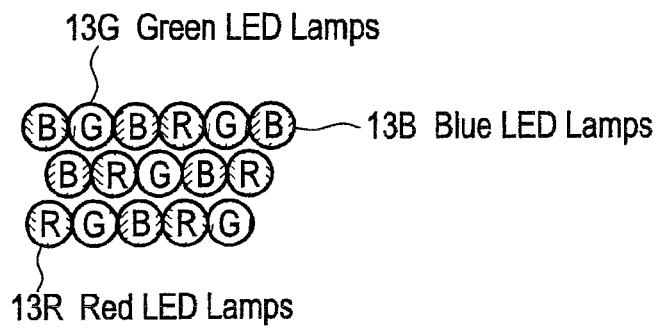

As an illumination light source for the transmission type liquid crystal panel 10 an LED light source 12 is used. The LED light source 12 has LED lamps 13 arranged two dimensionally on a substrate 14. In this embodiment, as shown in FIG. 1(B), LED lamps of three colors—red LED lamps 13R, green LED lamps 13G and blue lamps 13B—are used. FIG. 1(B) is a partial top view of the LED lamps 13, showing the arrangement of the LED lamps 13 on the substrate 14. The three-color LED lamps 13R, 13G, 13B are arranged in delta for uniform distribution over the substrate 14.

The scatterplate 11 is made of a material transparent to a visible light, such as acrylic, polycarbonate and glass. The scatterplate 11 may be formed at its side surface with a reflection plate.

Figure 3:
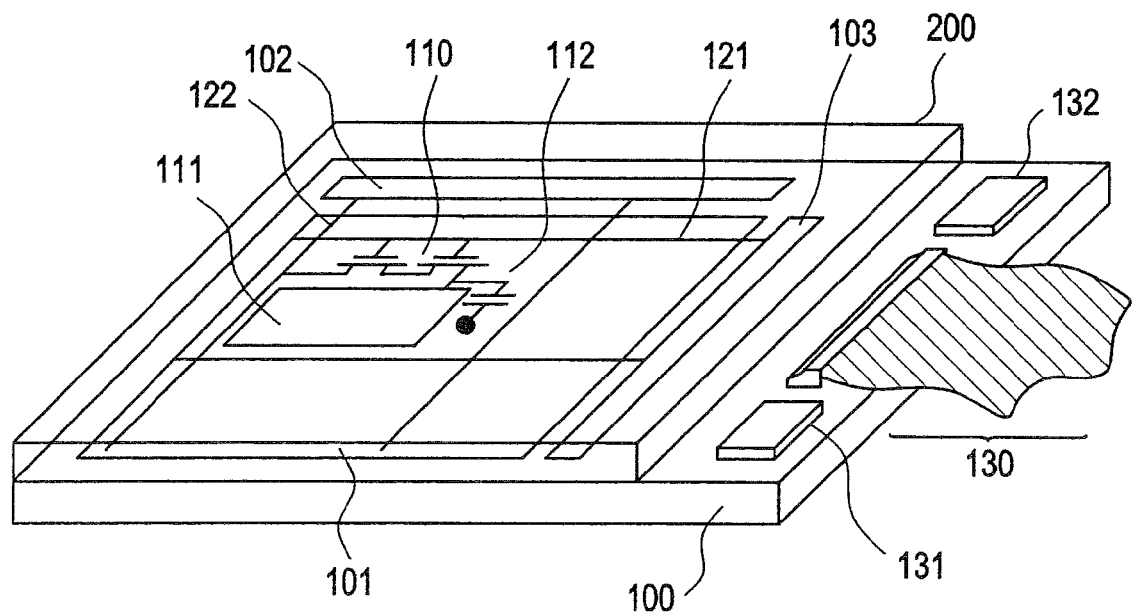
FIG. 3 is a schematic view showing the construction of the liquid crystal panel.

FIG. 3 shows an outline construction of the transmission type liquid crystal panel 10. An active matrix substrate comprises a pixel matrix circuit 101, a scan line drive circuit 102 and a signal line drive circuit 103, all formed on a glass substrate 100. The scan line drive circuit 102 and the signal line drive circuit 103 are connected to the pixel matrix circuit 101 through scan lines 121 and signal lines 122. These drive circuits 102, 103 are formed mainly of CMOS circuits.

The scan line 121 is formed for each row of the pixel matrix circuit 101 and the signal line 122 is formed for each column of the pixel matrix circuit 101. Near the intersections of the scan lines 121 and the signal lines 122, pixel TFTs 110 connected to the scan lines 121 and the signal lines 122 are formed. The pixel TFTs 110 are each connected with a pixel electrode 111 and a capacitor 112.

An active matrix substrate and a counter substrate 200 are bonded together with a liquid crystal sealed between them. The active matrix substrate is formed with external terminals of TFTs during the manufacturing process, and the portions of the active matrix substrate that are formed with the external terminals are not opposed to the counter substrate 200. The external terminals are connected with an FPC (flexible printed circuit) 130, through which external signals and power supply are fed to the circuits 101-103.

The counter substrate 200 is formed with color filters at portions facing the pixel matrix circuits, and the color filters are formed with a transparent conductive film such as ITO film over the entire glass substrate. The transparent conductive film is a counter electrode facing the pixel electrode 111 of the pixel matrix circuit 101. An electric field produced between the pixel electrode 111 and the counter electrode drives the liquid crystal material.

The active matrix substrate has IC chips 131, 132 at the FPC 130 mounting surface. These IC chips are formed with a video signal processing circuit, a timing pulse generation circuit, a correction circuit, a memory circuit, a calculation circuit and others. Although two IC chips are shown in FIG. 3, it is possible to use one IC chip or three or more IC chips.

In operating the liquid crystal display 21, the three-color LED lamps 13R, 13G, 13B of the LED light source 12 are illuminated. The red, green and blue rays emitted from the respective LED lamps enter the scatterplate 11 where they are scattered and mixed to form white rays LW that go out from the entire surface of the scatterplate 11. The white rays LW illuminate the whole back of the transmission type liquid crystal panel 10.

The white rays LW entering the transmission type liquid crystal panel 10 are modified according to the orientation of the liquid crystal material and pass through the color filters of the counter substrate. The PC user can recognize the transmitted light LT from the liquid crystal panel 10 as a color image.

Embodiment 2

In the embodiment 1, color filters are used to produce color images, and three-color LED lamps 13R, 13G, 13B are illuminated simultaneously to produce white light. In this embodiment 2, color images are made without using color filters.

One frame of a color image is divided into three sub-frames. Red, blue and green image data are successively written into the pixel electrodes in the active matrix substrate. Then, in synchronism with the writing of red, blue and green image data, the LED lamps 13R, 13B, 13G are controlled to be turned on. That is, while the red data is written, only the red LED lamp 13R is lighted and a red image is displayed on the liquid crystal panel 10.

In general, when the frequency of one frame is 60 Hz, the sub-frame frequency is 180 Hz. At this frequency a red image, a green image and a blue image are successively displayed. These red, green and blue images are combined on the retina of the user of PC 10 and recognized as a color image.

To drive the liquid crystal at a speed as high as 180 Hz, a ferroelectric liquid crystal material is appropriate for use with the liquid crystal material. When a nematic liquid crystal is used, it must be aligned in an optically compensated bend (OCB) mode.

Embodiment 3

This embodiment is a variation of the embodiment 1. While in the embodiment 1 the transmission type liquid crystal panel is mounted on a note PC, this embodiment 3 describes an example of a note PC using a reflection type liquid crystal panel. The external view of the note PC is shown in FIG. 2.

The reflection type liquid crystal panel does not require a backlight and therefore has the advantages of light weight and low power consumption. However, because external light is used, the display is hard to see in a dark place. This embodiment is intended to improve this drawback.

Figure 4A:
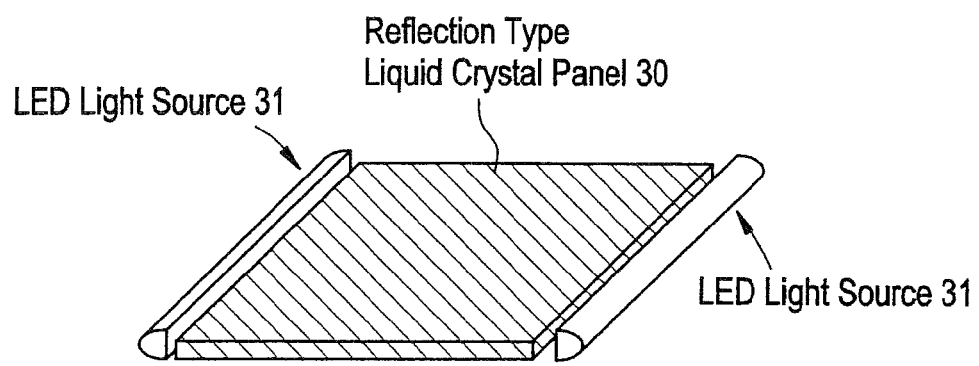
FIG. 4(A) is a schematic view showing the construction of a main part of a reflection type liquid crystal display.

FIG. 4(A) shows the construction of the main part of the liquid crystal panel 10 of this embodiment. At the opposing sides of a reflection type liquid crystal panel 30 are arranged LED light sources 31, which illuminate the reflection type liquid crystal panel 30 so that the display can be seen even in a dark place.

Figure 4B:
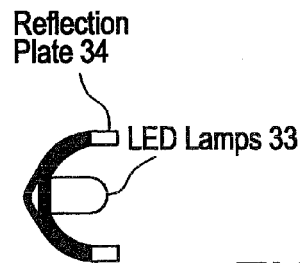
FIGS. 4(B) to 4(E) are views for explaining a LED light source.
Figure 4C:
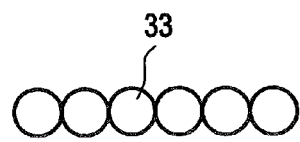

By referring to FIGS. 4(B) to 4(D), the construction of the LED light sources 31 will be explained. As shown in FIGS. 4(B) and 4(C), the LED light sources 31 have a first-dimensionally arranged LED lamps 33 and a reflection plate 34 arranged at the back of the LED lamps 33.

Figure 4D:
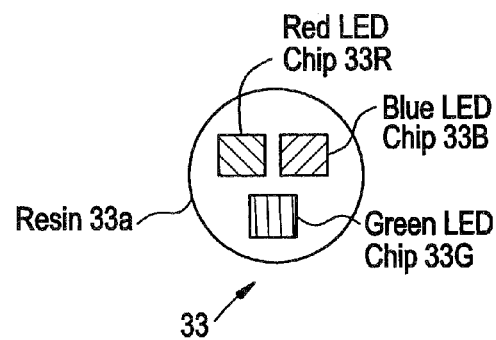

As shown in FIG. 4(D), the LED lamp 33 comprises a red LED chip 33R, a green LED chip 33G and a blue LED chip 33B arranged on a substrate, with the surface of these chips coated with resin 33a. The surface of the resin 33a is frosted.

Figure 4E:
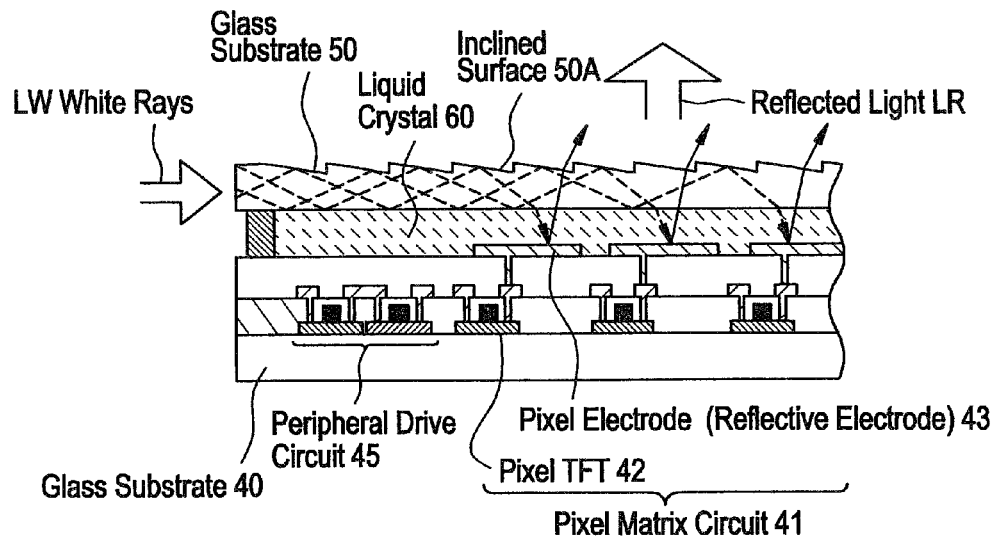

The function of the LED light sources 31 will be explained by referring to FIG. 4(E). FIG. 4(E) shows an outline cross section of the reflection type liquid crystal panel 30. The construction of the reflection type liquid crystal panel 30 is as shown in FIG. 3 and a liquid crystal 60 is sealed between glass substrates 40 and 50. The glass substrate 40 on the side of the active matrix substrate is formed with a pixel matrix circuit 41 and a peripheral drive circuit 45.

The pixel matrix circuit 41 is formed with pixel TFTs 42 and pixel electrodes (reflective electrodes) 43 made of metal material. The peripheral drive circuit 45 is formed mainly of CMOS circuits.

On the back of the glass substrate 50 on the counter substrate side are formed triangular wave-shaped inclined surfaces 50a. On the opposite side are formed color filters and counter electrodes.

When an image on the reflection type liquid crystal panel 30 is to be checked in a dark place, the LED lamps 33 of the LED light sources 31 are turned on. The red, blue and green 3-color LED chips 33R, 33G, 33B of the LED lamps 33 are applied with voltages to emit light. Light rays of red, blue and green colors emitted from the LED chips 33R, 33B, 33G are randomly scattered and mixed to form white light LW that goes out from the LED lamps 33.

The white light LW directly emitted from the LED lamps 33 or reflected by the reflection plate 34 enters the glass substrate 50 on the counter substrate side from its side. Because of the inclined surfaces 50a formed at the back of the glass substrate 50, the white light LW repeats being reflected as it propagates through the glass substrate 50 toward the inner part of the panel 30. The light that has entered is reflected by the reflection electrodes 43, passes through the glass substrate 50, and leaves the liquid crystal panel. The reflected light LR that has penetrated the glass substrate 50 is recognized as a color image by the PC user because it was modified when passing through the liquid crystal.

Figure 5A:
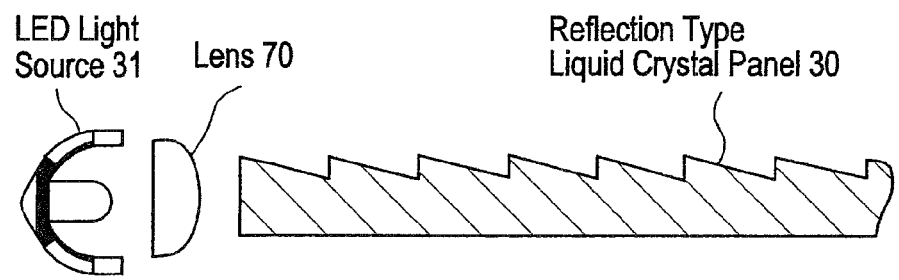
FIGS. 5(A) and 5(B) are schematic diagrams showing the arrangement of the liquid crystal panel and the LED light source.
Figure 5B:
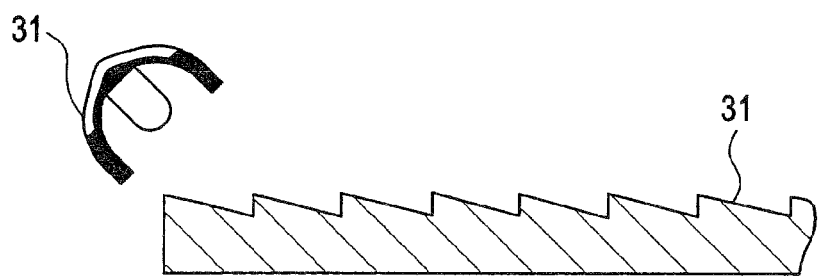
Figure 6A:
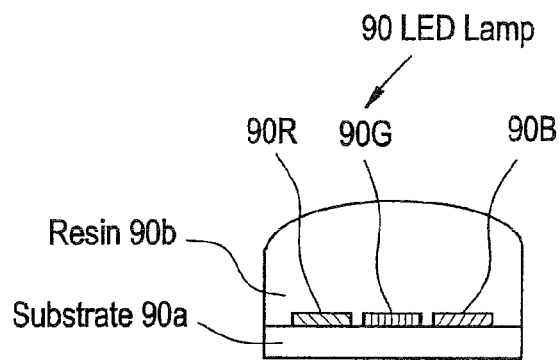
FIGS. 6(A) and 6(B) are schematic diagrams showing the construction of the LED light source.
Figure 6B:
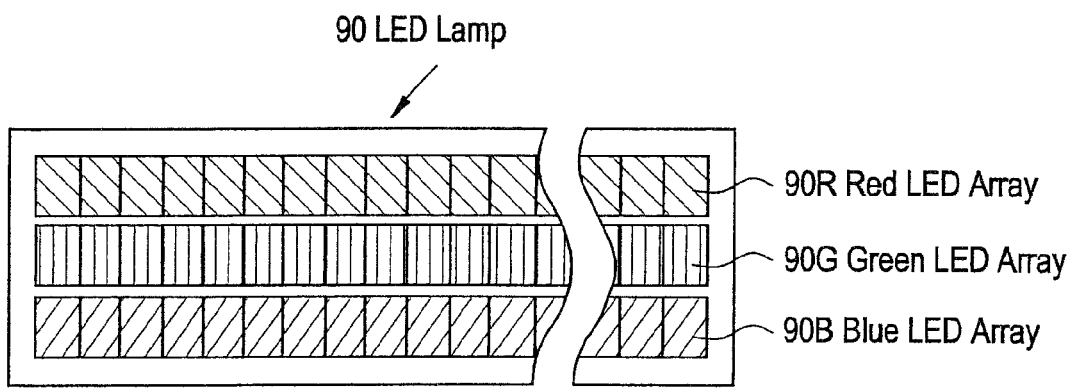

To ensure that the white light LW can enter the glass substrate 50 efficiently, it may be collected by a lens 70 such as a cylindrical lens before entering the liquid crystal panel 30, as shown in FIG. 5(A).

Rather than arranging the LED light sources 31 horizontally with respect to the liquid crystal panel 30, they may be arranged diagonally above the panel to throw the white light LW onto the back (the surface formed with the inclined surfaces 50a) of the glass substrate 50. In this case, too, the lens 70 may be provided as shown in FIG. 5(A).

While this embodiment provides two LED light sources 31, only one light source may be used. It is also possible to arrange three or four LED light sources to encircle the liquid crystal panel 30.

Embodiment 4

Although the reflection type liquid crystal panel of the embodiment 3 is shown to use color filters to display a color image, it is also possible, as in the embodiment 2, to display a color image by the reflection type liquid crystal panel without using the color filters.

In this case, red, blue and green LEDs are turned on in succession. Instead of using the LED lamps 33 of FIG. 4, an LED lamp 90 shown in FIG. 6 may preferably be used. The LED lamp 90 in this embodiment has a red LED array 90R, a green LED array 90G and a blue LED array 90B arranged on a substrate 90a and coated with resin 90b.

The LED arrays 90R, 90G, 90B can be turned on independently. At the timing that red, green and blue image data are written into the pixel electrodes, the corresponding color LED arrays can be turned on.

Embodiment 5

The CMOS circuits and pixel matrix circuits formed according to the invention can be used on a variety of electro-optical devices (active matrix type liquid crystal displays). That is, this invention can be applied to all electronic devices incorporating these direct-viewing type liquid crystal panels.

Such electronic devices include video cameras, digital cameras, head mounted displays (goggle type displays), car navigation equipment, personal computers and mobile information terminals (mobile computers, cellular phones or electronic books). Such examples are shown in FIGS. 7(A) to 7(F).

FIG. 7(A) shows a personal computer, which comprises a body 2001, an image input section 2002, a display 2003 and a keyboard 2004. This invention can be applied to the image input section 2002, the display 2003 and other signal control circuits.

FIG. 7(B) shows a video camera, which comprises a body 2101, a display 2102, a voice input section 2103, operation switches 2104, a battery 2105 and a picture receiving section 2106. This invention can be applied to the display 2102, a voice input section 2103 and other signal control circuits.

FIG. 7(C) shows a mobile computer, which comprises a body 2201, a camera section 2202, an image receiving section 2203, an operation switch 2204 and a display 2205. This invention can be applied to the display 2205 and other signal control circuits.

FIG. 7(D) shows a goggle type display, which comprises a body 2301, a display 2302 and an arm section 2303. This invention can be applied to the display 2302 and other signal control circuits.

FIG. 7(E) shows a player using a recording medium containing programs, which comprises a body 2401, a display 2402, a speaker 2403, a recording medium 2404, and an operation switch 2405. This device can use DVD (digital versatile disc), CD and others as a recording medium and allows the user to listen music, see movie and perform games and Internet. This invention can be applied to the display 2402 and other signal control circuit.

FIG. 7(F) shows a digital camera, which comprises a body 2501, a display 2502, an eyepiece 2503, operation switches 2504 and an image receiving section (not shown). This invention can be applied to the display 2502 and other signal control circuits.

As described above, the range of application of this invention is very wide, including electronic devices in various fields which incorporate the direct-viewing type liquid crystal display. These electronic devices can be implemented by using any combination of the above embodiments 1 to 4.

The use of the LEDs as an illuminating light source for the liquid crystal panel can eliminate the drawbacks of a backlight using a conventional cold cathode tube, such as high power consumption and short life of the light source, and offer reduced power consumption and longer life.

What is claimed is:
1. A display device comprising:
a first substrate;
a drive circuit comprising a first transistor over the first substrate;
a pixel matrix circuit over the first substrate, the pixel matrix circuit comprising:
a second transistor over the first substrate; and
a pixel electrode electrically connected to the second transistor;
an insulating layer over the drive circuit and the pixel matrix circuit;
a liquid crystal over the pixel electrode and the insulating layer;
a second substrate provided adjacent to the first substrate; and
an LED light source provided along an edge of the second substrate,
wherein the LED light source comprises a plurality of LEDs
wherein the pixel electrode is provided over the insulating layer, and
wherein the first transistor overlaps with the insulating layer, the liquid crystal, and the second substrate.
2. The display device according to claim 1,
wherein the first substrate is a glass substrate.

3. A display device comprising:
a first substrate;
a drive circuit comprising a first transistor over the first substrate;
a pixel matrix circuit over the first substrate, the pixel matrix circuit comprising:
    a second transistor over the first substrate; and
    a pixel electrode electrically connected to the second transistor;
an insulating layer over the drive circuit and the pixel matrix circuit;
a liquid crystal over the pixel electrode and the insulating layer;
a second substrate provided adjacent to the first substrate; and
an LED light source comprising a plurality of LED lamps which are provided along an edge of the second substrate,
wherein each of the plurality of LED lamps comprises a third substrate and a plurality of LEDs provided over the third substrate,
wherein the pixel electrode is provided over the insulating layer, and
wherein the drive circuit overlaps with the insulating layer, the liquid crystal, and the second substrate.

4. The display device according to claim 3,
wherein the first substrate is a glass substrate.

5. A display device comprising:
a first substrate;
a drive circuit comprising a first transistor over the first substrate;
a pixel matrix circuit over the first substrate, the pixel matrix circuit comprising:
    a second transistor over the first substrate; and
    a pixel electrode electrically connected to the second transistor;
an insulating layer over the drive circuit and the pixel matrix circuit;
a liquid crystal over the pixel electrode and the insulating layer;
a second substrate provided adjacent to the first substrate; and
LED light sources provided for both edges of the second substrate opposing to each other, each of the LED light sources comprising a plurality of LEDs which are provided along one of the both edges of the second substrate,
wherein the pixel electrode is provided over the insulating layer, and
wherein the drive circuit overlaps with the insulating layer, the liquid crystal, and the second substrate.

6. The display device according to claim 5,
wherein the first substrate is a glass substrate.

7. A display device comprising:
a first substrate;
a drive circuit comprising a first transistor over the first substrate;
a pixel matrix circuit over the first substrate, the pixel matrix circuit comprising:
    a second transistor over the first substrate; and
    a pixel electrode electrically connected to the second transistor;
an insulating layer over the drive circuit and the pixel matrix circuit;
a liquid crystal over the pixel electrode and the insulating layer;
a second substrate provided adjacent to the first substrate; and
LED light sources provided for both edges of the second substrate opposing to each other, each of the LED light sources comprising a plurality of LED lamps which are provided along one of the both edges of the second substrate,
wherein each of the plurality of LED lamps comprises a third substrate and a plurality of LEDs provided over the third substrate,
wherein the pixel electrode is provided over the insulating layer, and
wherein the drive circuit overlaps with the insulating layer, the liquid crystal, and the second substrate.

8. The display device according to claim 7,
wherein the first substrate is a glass substrate.

9. The display device according to claim 1, further comprising a resin covering the plurality of LEDs.

10. The display device according to claim 9, further comprising a third substrate in direct contact with the resin.

11. The display device according to claim 3, further comprising a resin covering the plurality of LEDs.

12. The display device according to claim 11, wherein the resin is in direct contact with the third substrate.

13. The display device according to claim 5, further comprising a resin covering the plurality of LEDs.

14. The display device according to claim 13, further comprising a third substrate in direct contact with the resin.

15. The display device according to claim 7, further comprising a resin covering the plurality of LEDs.

16. The display device according to claim 15, wherein the resin is in direct contact with the third substrate.

17. The display device according to claim 1, wherein the plurality of LEDs is one-dimensionally arranged along the edge of the second substrate.

18. The display device according to claim 9, wherein the resin has a curved upper surface.

19. The display device according to claim 1, wherein the plurality of LEDs is a plurality of LED chips.

20. The display device according to claim 3, wherein the plurality of LED lamps are one-dimensionally arranged along the edge of the second substrate.

21. The display device according to claim 11, wherein the resin has a curved upper surface.

22. The display device according to claim 3, wherein the plurality of LEDs is a plurality of LED chips.

23. The display device according to claim 5, wherein the plurality of LEDs is one-dimensionally arranged along one of the both edges of the second substrate.

24. The display device according to claim 13, wherein the resin has a curved upper surface.

25. The display device according to claim 5, wherein the plurality of LEDs is a plurality of LED chips.

26. The display device according to claim 7, wherein the plurality of LED lamps are one-dimensionally arranged along one of the both edges of the second substrate.

27. The display device according to claim 15, wherein the resin has a curved upper surface.

28. The display device according to claim 7, wherein the plurality of LEDs is a plurality of LED chips.

29. The display device according to claim 1,
wherein the second substrate has a first main surface and a second main surface opposite to the first main surface,
wherein the second main surface has an uneven shape, and
wherein the first main surface is located between the second main surface and the pixel matrix circuit.

30. The display device according to claim 29, wherein the uneven shape is a triangular wave shape.

31. The display device according to claim 1, wherein the liquid crystal is a ferroelectric liquid crystal.

32. The display device according to claim 1, wherein the liquid crystal is aligned in an optically compensated bend mode.

33. The display device according to claim 1, wherein the liquid crystal is provided between the first substrate and the second substrate.

34. The display device according to claim 3,
wherein the second substrate has a first main surface and a second main surface opposite to the first main surface,
wherein the second main surface has an uneven shape, and
wherein the first main surface is located between the second main surface and the pixel matrix circuit.

35. The display device according to claim 34, wherein the uneven shape is a triangular wave shape.

36. The display device according to claim 3, wherein the liquid crystal is a ferroelectric liquid crystal.

37. The display device according to claim 3, wherein the liquid crystal is aligned in an optically compensated bend mode.

38. The display device according to claim 3, wherein the liquid crystal is provided between the first substrate and the second substrate.

39. The display device according to claim 5,
wherein the second substrate has a first main surface and a second main surface opposite to the first main surface,
wherein the second main surface has an uneven shape, and
wherein the first main surface is located between the second main surface and the pixel matrix circuit.

40. The display device according to claim 39, wherein the uneven shape is a triangular wave shape.

41. The display device according to claim 5, wherein the liquid crystal is a ferroelectric liquid crystal.

42. The display device according to claim 5, wherein the liquid crystal is aligned in an optically compensated bend mode.

43. The display device according to claim 5, wherein the liquid crystal is provided between the first substrate and the second substrate.

44. The display device according to claim 7,
wherein the second substrate has a first main surface and a second main surface opposite to the first main surface,
wherein the second main surface has an uneven shape, and
wherein the first main surface is located between the second main surface and the pixel matrix circuit.

45. The display device according to claim 44, wherein the uneven shape is a triangular wave shape.

46. The display device according to claim 7, wherein the liquid crystal is a ferroelectric liquid crystal.

47. The display device according to claim 7, wherein the liquid crystal is aligned in an optically compensated bend mode.

48. The display device according to claim 7, wherein the liquid crystal is provided between the first substrate and the second substrate.

49. The display device according to claim 1, wherein the second substrate is a glass substrate.

50. The display device according to claim 3, wherein the second substrate is a glass substrate.

51. The display device according to claim 5, wherein the second substrate is a glass substrate.

52. The display device according to claim 7, wherein the second substrate is a glass substrate.

53. The display device according to claim 1, wherein the LED light source is separated from the second substrate with a space.

54. The display device according to claim 3, wherein the LED light source is separated from the second substrate with a space.

55. The display device according to claim 5, wherein each of the LED light sources is separated from the second substrate with a space.

56. The display device according to claim 7, wherein each of the LED light sources is separated from the second substrate with a space.

57. The display device according to claim 1, wherein the pixel electrode is a reflective electrode.

58. The display device according to claim 3, wherein the pixel electrode is a reflective electrode.

59. The display device according to claim 5, wherein the pixel electrode is a reflective electrode.

60. The display device according to claim 7, wherein the pixel electrode is a reflective electrode.

* * * * *